US010575064B1

(12) United States Patent
Kocks et al.

(10) Patent No.: US 10,575,064 B1
(45) Date of Patent: *Feb. 25, 2020

(54) SYSTEMS AND METHODS FOR INTERNET VIDEO DELIVERY

(71) Applicant: Oath Inc., Dulles, VA (US)

(72) Inventors: Peter F. Kocks, San Francisco, CA (US); Rami El Mawas, Dublin, CA (US); Ping-Hao Wu, San Francisco, CA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,579

(22) Filed: Dec. 5, 2017

Related U.S. Application Data

(63) Continuation of application No. 13/303,348, filed on Nov. 23, 2011, now Pat. No. 9,860,604.

(51) Int. Cl.
| | |
|---|---|
| *H04N 21/637* | (2011.01) |
| *H04N 21/433* | (2011.01) |
| *H04N 21/845* | (2011.01) |
| *H04L 29/06* | (2006.01) |
| *H04N 21/262* | (2011.01) |
| *H04N 21/658* | (2011.01) |
| *H04N 5/14* | (2006.01) |

(52) U.S. Cl.
CPC ....... *H04N 21/637* (2013.01); *H04L 65/4084* (2013.01); *H04L 65/80* (2013.01); *H04N 21/262* (2013.01); *H04N 21/4331* (2013.01); *H04N 21/658* (2013.01); *H04N 21/845* (2013.01); *H04N 21/8456* (2013.01); *H04N 5/147* (2013.01)

(58) Field of Classification Search
None
See application file for complete search history.

(56) References Cited

U.S. PATENT DOCUMENTS

| 5,612,742 A | 3/1997 | Krause et al. |
|---|---|---|
| 8,369,401 B1 | 2/2013 | Goh et al. |
| 8,442,265 B1 | 5/2013 | Bosworth et al. |

(Continued)

OTHER PUBLICATIONS

Aksoy et al., "Graph-theoretic clustering for image grouping and retrieval," Proceedings of the 1999 IEEE Computer Society Conference on Computer Vision and Pattern Recognition; vol. 1, No. 23; Jun. 1999; pp. 63-69.

(Continued)

*Primary Examiner* — Thomas J Dailey
(74) *Attorney, Agent, or Firm* — Bookoff McAndrews, PLLC

(57) ABSTRACT

Systems and methods are disclosed for delivering video content over a network, such as the Internet. Videos are identified and pre-processed by a web service and then separated into a plurality of segments. Based on user interests, video segments may be pre-fetched and stored by a client associated with a user. Upon receiving a selection from a user to play a video, the first video segment may begin playing instantaneously from a local cache. While the first video segment plays, subsequent video segments are transmitted from the web service to the client, so that the subsequent video segments will be ready for viewing at the client when playback of the first video segment has finished.

21 Claims, 4 Drawing Sheets

(56) References Cited

U.S. PATENT DOCUMENTS

| | | |
|---|---|---|
| 8,583,725 B2 | 11/2013 | Gibson |
| 8,639,756 B2 | 1/2014 | Bostrom et al. |
| 2002/0028021 A1 | 3/2002 | Foote et al. |
| 2002/0129375 A1 | 9/2002 | Kim et al. |
| 2005/0123052 A1* | 6/2005 | Rabinowitz .......... H04N 19/142 |
| | | 375/240.24 |
| 2007/0165524 A1 | 7/2007 | Mascolo |
| 2007/0239882 A1 | 10/2007 | Lai et al. |
| 2007/0250502 A1 | 10/2007 | Canright et al. |
| 2007/0255844 A1 | 11/2007 | Shen et al. |
| 2008/0114889 A1 | 5/2008 | Deshpande |
| 2009/0019489 A1 | 1/2009 | Ohlfs et al. |
| 2009/0228919 A1 | 9/2009 | Zott et al. |
| 2009/0292685 A1 | 11/2009 | Liu et al. |
| 2009/0297123 A1 | 12/2009 | Virdi et al. |
| 2010/0275233 A1 | 10/2010 | Soohoo et al. |
| 2011/0026763 A1 | 2/2011 | Diggins |
| 2011/0246661 A1 | 10/2011 | Manzari et al. |
| 2012/0062793 A1 | 3/2012 | Vanderhoff |
| 2012/0174157 A1 | 7/2012 | Stinson et al. |
| 2012/0237183 A1 | 9/2012 | Chen et al. |
| 2013/0347056 A1 | 12/2013 | Kuhlman et al. |

OTHER PUBLICATIONS

International Search Report for International Application No. PCT/US2012/65206, dated Mar. 11, 2013 (3 pages).

Written Opinion of the International Searching Authority for International Application No. PCT/US2012/65206, dated Mar. 11, 2013 (5 pages).

* cited by examiner

SYSTEMS AND METHODS FOR INTERNET VIDEO DELIVERY

CROSS-REFERENCE TO RELATED APPLICATIONS

This application is a continuation of U.S. patent application Ser. No. 13/303,348, filed Nov. 23, 2011 (now allowed), which is expressly incorporated herein by reference in its entirety.

TECHNICAL FIELD

The present disclosure relates to communication networks and systems and methods for distributing content, including video and audio files. More particularly, and without limitation, the present disclosure relates to systems and methods for video delivery, including asynchronous delivery of video over the Internet.

BACKGROUND

Delivering video or audio files over the Internet presents unique challenges not faced by traditional broadcast television. One of the main challenges is overcoming network latency. Network latency refers to the time delay in delivering data over a network to a user or client device. The amount of data to be delivered will vary according to the scope and size of the content.

To deliver content obtained from an Internet resource, a browser on a client device must first connect to a server. After the browser has connected to the server, the server may send the content to the browser via a network connection. With broadcast television, a television simply plays the content that is being simultaneously transmitted by a system operator (e.g., cable operator) to many users. Further, video or other content delivered over the Internet is transmitted individually to a browser. In other words, a one-to-one connection between a server and browser is required, unlike in a one-to-many architecture used in broadcast television.

Many attempts have been made to improve content delivery over the Internet. For example, with respect to video content, many efforts have focused on improving existing standards for video delivery. For example, one proposed method is to stream video using content delivery network (CDN) technology that provides low latency and higher bandwidth to consumers by caching content on servers that are in close network proximity to end users. While this and other improvements have enhanced video delivery, the fundamental problems discussed above persist.

SUMMARY

Consistent with the present disclosure, systems and methods are provided for delivering content over a network, such as the Internet. Embodiments consistent with the present disclosure include systems and methods for delivering video or other content over the Internet. In certain embodiments, video may be delivered asynchronously to a user by, among other things, pre-fetching one or more video segments and storing the same on a browser associated with a user. These and other aspects of the disclosed embodiments may overcome one or more of the problems set forth above.

In accordance with one disclosed exemplary embodiment, a system is provided for delivering video content over a network. The system includes a memory and a processor coupled to the memory and configured to divide a video into segments and send those segments for display on a client device. After the video is divided into segments, the system determines a number n of segments to transmit to a client device. The first n segments of video are then transferred to the client device. When the system receives a notification that a client device has begun playing a video, the system then transmits the remaining video segments to the client device.

In accordance with another exemplary embodiment, a method is provided for delivering video content over a network. According to the method, a video is divided into segments and sent over a network for display on a client device. After the video is divided into segments, a number n of segments to transmit to a client device is determined. The first n segments are then transferred to the client device. Upon receiving a notification that a client device has begun playing a video, the remaining video segments are then sent to the client device.

According to still another exemplary embodiment, a computer readable medium is provided including instructions for delivering video content over a network. When executed, the instructions perform steps to divide a video into segments and send those segments over a network for display on a client device. After the video is divided into segments, a number n of segments to transmit to a client device is determined. The first n segments are then transferred to the client device. Upon receiving a notification that a client device has begun playing a video, the remaining video segments are then sent to the client device.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Figure 1:
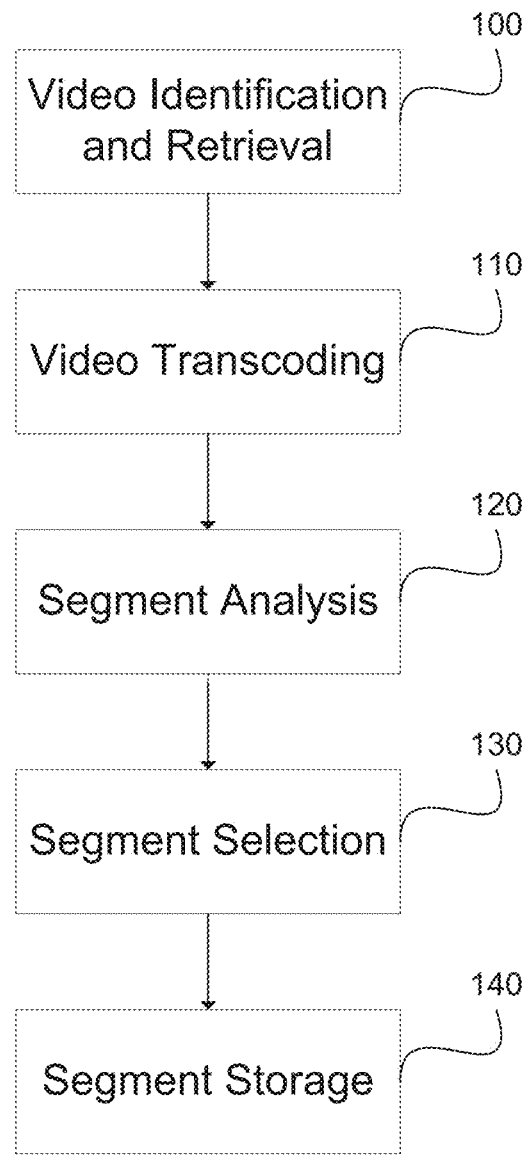
FIG. 1 is a flow diagram depicting an exemplary method for preparing a video for delivery to users, in accordance with an embodiment of the present disclosure.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by a processor that receives instructions from a non-transitory computer-readable storage medium. Similarly, a system described herein may include at least one processor and memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Exemplary methods and systems are described herein for delivering content over a network, such as the Internet. The content may comprise video or audio files. The delivery of the content may be achieved asynchronously from, for example, a server or web service to a client device. Embodiments of the present disclosure may pre-fetch one or more segments of the content and store the same for subsequent play back at the client device. Upon play back of the pre-fetched segments, the remaining segments of the content may be streamed or delivered to the client device.

In accordance with certain embodiments of the present disclosure, video may be analyzed and divided into segments prior to transmission from a web service to a client device. After the video is divided into segments, a first video segment may then be pre-fetched by the client device and locally cached or otherwise stored for subsequent retrieval. Accordingly, no network connection is initially required when a user chooses to watch the video. Further segments of the video are delivered to the client device using a network connection. In one embodiment, the remaining video segments are asynchronously transmitted to the client device. In certain exemplary embodiments, the remaining video segments may be transmitted using an established streaming protocol, such as Real Time Streaming Protocol (RTSP). In still other embodiments, the video segments are delivered simultaneously to multiple endpoints using a broadcast mechanism.

FIG. 1 illustrates a flow diagram depicting an exemplary method for preparing content (in this example video) for delivery to users. As shown in FIG. 1, the following steps may be performed to prepare a video for delivery: video identification and retrieval (step 100), video transcoding (step 110), segment analysis (step 120), segment selection (step 130), and segment storage (step 140).

As part of step 100, a video may be identified as a potential video for transmission to one or more users. In one embodiment, a bot, or software agent, may crawl through, or browse, web pages throughout the World Wide Web to identify potential videos for transmission to one or more users. In an alternate embodiment, a video may be identified using a content management system and/or from multiple sources other than the World Wide Web. In yet another embodiment, videos may be identified for transmission to one or more users based on the viewing histories or preferences of users of a video service. Upon identification of a video for potential transmission to one or more users, the video is stored in a memory or other storage device, such as a database, such that the video may subsequently be manipulated in preparation for delivery to one or more users, in accordance with embodiments of the present disclosure.

After a video has been identified for potential transmission to one or more users, the video is transcoded into a common format, as part of step 110. As videos may be identified from throughout the World Wide Web or other sources, an identified video may be encoded in one of numerous formats. Transcoding, or digitally converting, a video into a common format may provide for more flexible and efficient video processing, as described below with respect to, for example, steps 120 and 130. Potential formats into which videos may be encoded as part of step 110 include MPEG-2, MPEG-4, and H.264 formats, among others. Other conventional video formats will be appreciated by those skilled in the art As part of step 120, a video may be separated or divided into segments. In one embodiment, the video may be broken up into segments of equal length or size. For example, a video with a duration of ten minutes may be separated into five segments, each two minutes in length. Similarly, a video containing five megabytes of data may be separated into five segments, each containing one megabyte of data.

In an alternate embodiment, visual and audio components of the video content may be analyzed to determine the appropriate points at which to separate or divide the content into segments. By way of example, a video may be segmented based on the timing of scene changes within the video. A scene change may be determined by visual and/or audio cues. A visual cue for a scene change may be the changing of the majority of pixels from one frame of video to the next, a significant change in camera angle between frames, or a significant change in the foreground of a frame while the background remains the same. Audio cues for a scene change may include the beginning or end of an individual or group dialogue, a transition from one person speaking to another, as well as the start or end of laughter, applause, or the playing of music. By segmenting videos based upon scene changes, the user viewing the video is less likely to notice a transition between video segments, thus enhancing the user's viewing experience.

In accordance with certain embodiments, to detect a scene change, each video frame is compared with its previous frame(s) and a corresponding distance measure is calculated.

This distance measure may indicate how much the content has changed between frames. Further, a threshold distance may be specified for purposes of detecting scene changes. Accordingly, when the calculated distance measure between a video frame and its previous frame exceeds the specified threshold, the video frame is considered to be a point at which a scene change occurs.

As discussed above, numerous methods may be implemented for detecting a scene change, including computing a distance measure. A distance measure may be computed by analyzing the difference between the color histograms of two frames. Such an analysis may provide a good indicator of a significant change in the image and is less computationally intensive than comparing images pixel-for-pixel. According to one embodiment, the distance measure may be computed according to the following formula:

$$D(n, d) = |H(n) - H(n-d)| = \sum_i |H(n, i) - H(n-d, i)|,$$

where H(n) is the color histogram of frame n, and d is an integer specifying how far the two frames under comparison are apart (d=1 indicates an immediately adjacent frame).

The threshold distance may be pre-determined or adaptive to statistics collected regarding the distances of neighboring frames in a local window. For example, the threshold can be calculated as:

$$T(n) = m(n) + a \cdot s(n),$$

where m(n) and s(n) are the mean and the standard deviation of the distances in a local window around the frame n, respectively, and a is a scale factor for adjusting the detection precision.

In yet another embodiment, a video may be segmented in such a manner that any potential interruption caused by segmentation is least noticeable. For example, a video may be segmented at scene changes, as discussed above, or at still frames wherein a majority of pixels do not change significantly for a short period of time. This manner of video segmentation may be implemented, for example, using a video graph.

A still frame may be detected based on analysis of changes between video frames. If the number of changes detected between video frames is considerably low for a specified period of time, the video frame may be designated a still frame. Numerous metrics may be utilized to determine a change in frames, such as color histogram analysis, as discussed. In addition to color histogram analysis, frame changes may be determined based on measurement of changes in pixel value on a pixel-by-pixel basis.

Motion information may also be utilized to determine changes between video frames or scenes. In order to analyze changes between video frames using motion information, a current frame may be divided into blocks. A motion vector may be computed for each block by analyzing the shift from a block in the previous frame that is most similar to the current block. The standard deviation of magnitude for all motion vectors is used as the measurement of the activity. The advantage of using motion information is that the motion vector is readily available in the compressed bitstream, which means computations can be saved by only partially decoding the video.

In addition to the above exemplary embodiments for detecting scene changes, other techniques for determining a transition between scenes within a video may be used as part of segment analysis in step 120. Moreover, in certain embodiments, the segments may be determined using metadata or based on input from an entity such as a system operator or administrator.

One or more of the video segments created during segment analysis in step 120 may be selected for storage in step 130 and then stored in a database or file system at step 140. In accordance with certain embodiments, large scale databases may be utilized for storing the video segments. In certain cases, the video segments may be stored individually or together with the original, non-segmented video content. If storage resources are limited, it may be beneficial to store fewer segments to conserve resources. Further, many or all segments may initially be selected for storage and then subsequently deleted if not selected by, or recommended to, a user for viewing.

After a video has been prepared for transmission, the video may be delivered to one or more users for playback. The playback of a video may be achieved using a browser or media player (collectively referred to herein as "browser") associated with a client device of a user. As disclosed herein, because a first n segments of a video may be transmitted to the client device prior to the user selecting to begin playback of the video, video playback may begin instantaneously upon selection by the user, without requiring establishment of a network connection.

Figure 2:
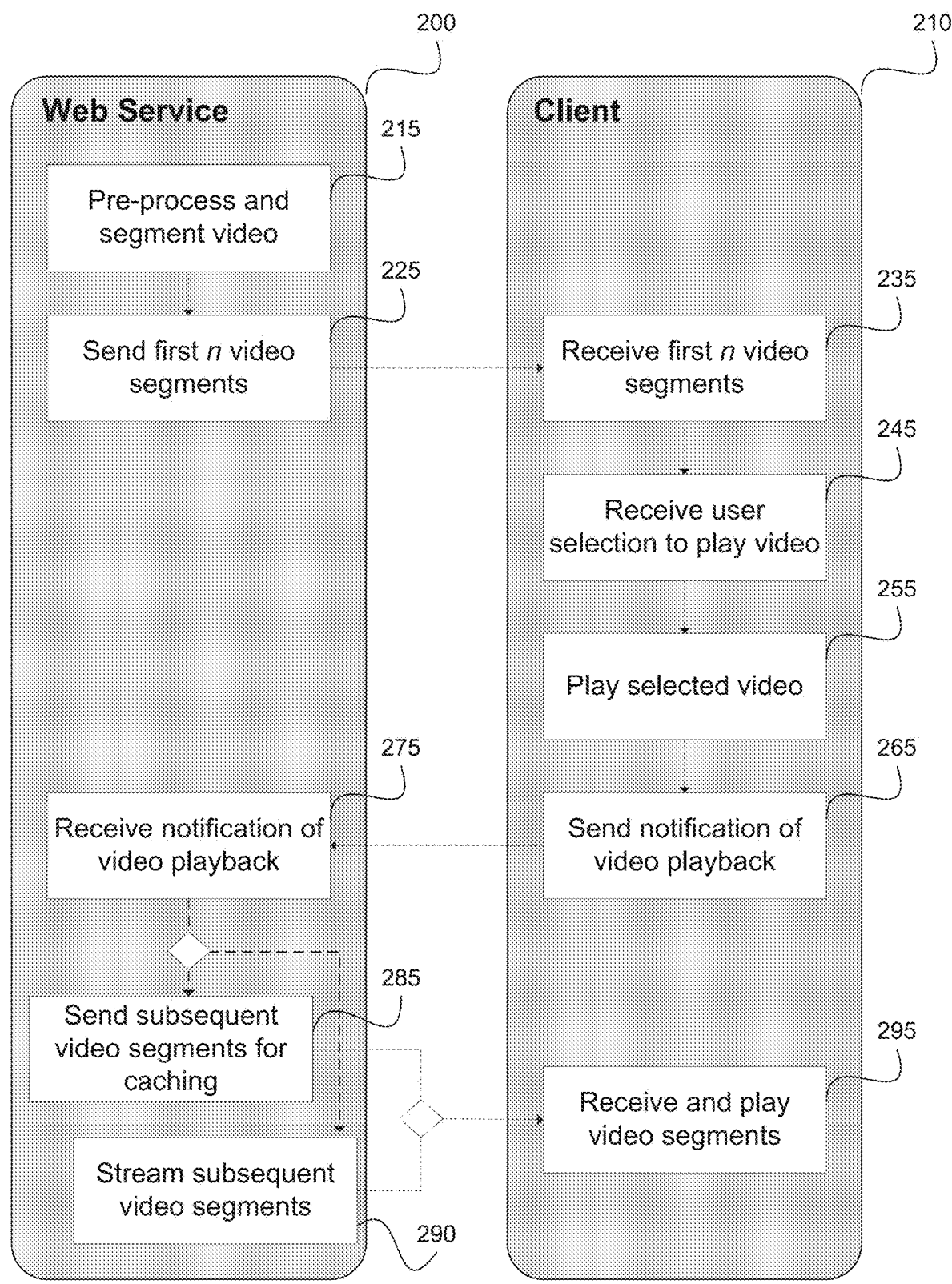
FIG. 2 is a diagram illustrating exemplary steps for transmitting video from a web service to a client, in accordance with an embodiment of the present disclosure.

FIG. 2 illustrates an exemplary embodiment for delivering videos to users, in accordance with the present disclosure. As shown in FIG. 2, a web service 200 and a client 210 may be provided. The web service 200 and client 210 may communicate over a network (not shown), such as the Internet. Aspects of the web service 200 and the client 210 are further described below. As will be appreciated from this disclosure, the number of elements shown in FIG. 2 is for purposes of illustration only. Thus, while only one web service 200 and client 210 are shown, any number of web services 200 and clients 210 may be provided. Further, it will be appreciated that any individual web service 200 may deliver video to any number of clients 210.

The exemplary embodiment FIG. 2 also illustrates processes and steps that may be implemented by and between web service 200 and the client 210. At step 215, a video is pre-processed and divided into segments at the web service 200. By way of example, step 215 may be implemented in accordance with the exemplary embodiment described above with respect to FIG. 1. At step 225, the first n segments of a video are sent from the web service 200 to the client 210 (i.e., the first n segment of video are "pre-fetched" by the client 210). The video is received by the client 210 at step 235. At step 245, a user of client 210 may select the video for playback. Following user selection of the video, the client 210 plays the video for the user at step 255. Because the first n segments of the video have been pre-fetched by the client 210, the client 210 may begin to play the video instantaneously, without establishing a network connection. Further, to confirm that the client 210 has fully downloaded, or pre-fetched, the entire first n video segments, the client 210 may send the web service 200 an appropriate indication.

At step 265, the client 210 sends a notification to the web service 200 that the client 210 has initiated playback of the video. Upon receiving the notification at step 275, the web service 200, at step 285, may send one or more subsequent segments of the video to the client 210, so that the client 210 may cache, or otherwise store, and play those subsequent segments after the initial n segments have completed playing. Alternatively, at step 290, the remainder of the video (i.e., all but the first n segments of the video) can be delivered by the web service 200 to the client 210 using standard streaming protocols that begin buffering the stream during the playback of the initial n video segments. The remainder of the video may be streamed to the client 210, for example, when caching of one or more subsequent segments is taking longer than the runtime of the segment that is currently being played. Thus, the next segment is streamed to avoid interruption in delivery of the video to the client 210 in situations where the client 210 has been unable to cache the video within a certain period of time, which may be the runtime of the current video or some other time specified by a user. The remaining video segments are received and played at the client 210 (e.g., from a stream or from the cache) at step 295.

By dividing the video into segments as described above, transitions between video segments may appear seamless to the user. In effect, a video may be separated into segments that are played back in sequence in a manner similar to a video playlist.

In an alternative embodiment, segments of video pre-fetched by the client 210 may combine to form a preview of video content. When a user selects to watch the preview, the full video corresponding to the preview may begin to stream in the background prior to receiving a selection from the user to watch the full video. Accordingly, in the event that the user selects to view the full video during or after watching the video preview, the browser will be better prepared to play back the full video for the user.

In yet another alternative embodiment, commercial advertisements may be delivered to a user of the web service 200. In this embodiment, the first scene of a commercial (or an entire commercial) is pre-fetched by the client 210 and stored in a cache or another memory device associated with the client 210 for as long as the commercial is in circulation. When the user selects content to watch, the client 210 may immediately begin playing the commercial while the client 210 establishes a network connection to the web service 200 to obtain the content selected by the user. During playback of the commercial, the client 210 may buffer the selected content, so once the commercial has finished playing, the content will be ready to begin playback immediately.

As mentioned above, a client 210 may be used to pre-fetch segments of a video and then subsequently play back the full video content to the user. The client 210 may comprise any application, program, or module on a client device that is used by a user to watch video content. In one embodiment, the client 210 comprises a web browser on a personal computer, tablet, personal digital assistant, cellular phone, or other device. Exemplary web browsers include Internet Explorer, Firefox, Chrome, Safari, and Opera. Such web browsers may implement a variety of Application Programming Interfaces (APIs), such as HTML5. In an alternative embodiment, the client 210 may include a media player, such as Windows Media Player, iTunes, and Real-Player. In still a further embodiment, client 210 may comprise a set top box or digital video recorder.

The client 210 may establish a network connection using a networking protocol, such as hypertext transfer protocol (HTTP). After establishing the network connection, the client 210 may use the connection to connect to the web service 200. In one embodiment, the web service 200 may comprise a server or server system. A server system may include one or more servers. The servers may be implemented as part of a server farm or cluster, with appropriate load balancing. In still further embodiments, the web server 200 may be implemented as part of a content delivery network, comprising a plurality of servers that delivery video to geographically dispersed users.

In accordance with certain embodiments, the client 210 may establish a network connection for pre-fetching the first n segments of video from the web service 200. The same or a subsequent network connection may be used by the client 210 for downloading or streaming subsequent video segments. In addition to pre-fetching, downloading, and streaming video segments, a network connection may be utilized to send and receive video metadata and video usage data between the client 210 and the web service 200 or an external server or service.

The pre-fetching of video segments may be done periodically or upon the occurrence of predetermined events. For example, in certain embodiments, pre-fetching of video segments may be performed when a browser or other application on the client 210 is launched or initiated. In one embodiment, the client 210 may pre-fetch video segments in response to user navigation to a web site using a web browser, for example. Alternatively, the client 210 may pre-fetch video segments when a media player is initiated or when a set top box or digital video recorder is powered on by a user. Pre-fetching of video segments can also be performed automatically at predetermined intervals (e.g., every ten minutes, every hour, four times per day, etc). In addition to pre-fetching video segments, the client 210 may also prepare certain components for video playback. For example, the client 210 may initiate a display controller process when pre-fetching video segments.

In accordance with embodiments of the present disclosure, the pre-fetching process may run independently of other processes. For example, pre-fetching may be implemented in its own thread to retrieve video segments from the web service 200 or another source. The amount of video segments pre-fetched by the client device 210 may depend on one or more factors, such as the type of client device, amount of available storage at the client device, and network bandwidth. For example, in cases where the client device 210 comprises a personal computer with a large storage capacity, the client device may pre-fetch a higher number of video segments. In contrast, in situations where the client device 210 is implemented with a mobile phone, personal digital assistant, or small device with limited storage capacity, a lower number of video segments may be pre-fetched.

Pre-fetched video segments may correspond to subsequent scenes from a single video. In other cases, the video segments may be initial segments from each of a plurality of adjacent videos in a playlist. For example, the video segments may be the initial n segments from each video in a playlist created by a user. A playlist may be a list of videos identified by a user for playback in, for example, a cloud computing environment. In other embodiments, the content to be delivered comprises audio files and the playlist includes a list of songs, for example. In such cases, a pre-fetching process may be implemented to pre-fetch the initial n segments from one or more songs in a user's playlist.

Video segments and other data (including metadata and commercials) may be stored in a persistent database. In one embodiment, the persistent database may be stored locally on the client 210. By storing the information locally, fewer network connections may be needed between the client 210 and the web service 200. Accordingly, the client 210 may be more responsive to user actions, as latency and other delay attributed to network connections is minimized. Alternatively, the persistent database may be stored on a network drive or remote server and accessed by the user through one or more network connections between the client 210 and the network drive and remote server.

Whether stored locally or remotely via a network connection, the persistent database may store information regarding the current cache state of videos and video segments. As an example, for each video, data pertaining to segments associated with the video and the current cache state of each segment may be stored in the persistent database. In addition to data regarding videos, or video segments, that have already been downloaded to the client 210, or selected for play-back by the user, the persistent database may also store metadata associated with videos. The metadata may be pre-fetched at select times from the web service 200 or another source in order to provide as much bandwidth for content delivery as possible. For example, metadata associated with one or more videos may be pre-fetched after the content of another video has finished downloading or streaming to the client device, so that the download or streaming of video content is not limited by the download of metadata for other videos. Alternatively, metadata for videos that have yet to be selected for download or streaming by a user may be downloaded to the persistent database at any time during which no other video content is currently downloading or streaming to the client device. Metadata may also be scheduled for download at certain times of the day, or periodically throughout the day, so as to minimize the likelihood that download of metadata will interfere with download of video content. For example, a user may schedule the download of metadata associated with videos to occur at night when the user is asleep, and therefore not downloading or streaming video content, or otherwise extensively utilizing network resources associated with the user device. In accordance with still further embodiments, the above processes for downloading metadata may also be implemented for advertisements or commercials, as well as other data.

As part of the content pre-fetching process, video tags may be generated that are associated with one or more videos by using relevant information found in the corresponding metadata for those select videos. Video tags may be attached to, for example, a Document Object Model (DOM) tree. Once the download of video content is complete, video tags may be detached to ensure a steady performance of a browser and/or other applications on the client 210. In accordance with one embodiment, subsequent creations of video tags that have been already attached/detached would not trigger a network request for the content, but rather communicate with a browser cache to obtain a cached (i.e., pre-fetched) version of the video. Each time a video tag is created, a reference to the actual node on the DOM may be saved until it gets detached. In some instances, those nodes will not have enough time to become detached, as a user may opt to view the video before it is fully downloaded to the client device 210.

In accordance with certain embodiments, a display controller may manage user interactions with the client 210. A user may interact with the client 210 through numerous input devices, such as a keyboard, mouse, or remote control. Upon receipt of input from the user, such as a mouse click or press of a keyboard or remote control, the display controller may alter video playback. For example, in embodiments where the client 210 is implemented on a personal computer, the user may utilize a mouse connected to the personal computer to navigate a pointer to controls associated with a video displayed by the client 210 on a display device associated with the personal computer (e.g., LCD, LED, or CRT monitor). Controls associated with the video may be presented in the form of buttons commonly associated with video playback, such as buttons for play, stop, rewind, fast forward, slow motion, previous scene, next scene, full screen, etc. The user may request that the client 210 perform a function associated with one or more of the control buttons by navigating the pointer to the one or more buttons and clicking on a button with the mouse. Alternatively, the user may control the video with a keyboard or remote control by using preprogrammed buttons on those input devices associated with the aforementioned controls (e.g., play, stop, rewind, etc.). In addition to using these input devices to interact with a personal computer, these and other input devices may be used with, for example, a set-top box or digital video recorder to control a video displayed by the client device 210. Further, these and other forms of input, such as touch-based input, may be utilized to control video displayed by the client 210 on a portable device, such as a tablet, personal digital assistant, or cellular phone, or any other device that may be utilized by a user to perceive video.

Data pertaining to user interactions with video content may be logged as usage data. Such usage data may be stored with the web service 200 that provides videos to the user. Alternatively, usage data may be stored in a local or remote database and then later uploaded to the web service 200. This usage data may be utilized by the web service 200 and client 210 to personalize services provided to the user in conjunction with video transmission, such as described below with respect to recommendations and advertisements.

The client 210 may connect to the web service 200 via a network, such as the Internet, through a network communications protocol, such as HTTP. This network connection may be utilized to transfer various types of information discussed herein, such as video segments, metadata, and usage data. The network may comprise any combination of networks, including wired and/or wireless networks. Other types of networks and network protocols may be utilized, as will be appreciated from the teachings of this disclosure.

As discussed above in conjunction with FIG. 1, a video may also be separated or divided into segments for delivery to the client 210. Videos, or video segments, may be sent from a web service 200 to the client 210 using HTTP progressive download or another protocol for network data transmission, such as a streaming protocol.

By using HTTP progressive download, a user may begin playback of a video before download of the full video is complete. For example, a user may begin to watch a first segment of a video while one or more subsequent video segments are downloaded to the user device. In one embodiment, video segments may be stored to a temporary location associated with the client device, such as a cache associated with a web browser running on the client. After a user views each video segment, that segment may be deleted from the client device to make room for additional video segments or other data. In an alternative embodiment, video segments that have been stored, cached, or pre-fetched may remain stored on the client device beyond the time at which the user has viewed the video segments. For example, the video segments may remain in a cache, or other storage associated with the client device, until the user explicitly specifies that the video segments be deleted from the cache. In a variation of this alternate embodiment, video segments may be deleted from the cache or other storage periodically or according to some schedule set either by a user or automatically by the user device to guarantee sufficient space in the cache for future video storage.

Commands to cache videos, or video segments, may be sent from the web service 200 to the client 210 at the user device in headers of HTTP response packets. Such commands may be referred to as HTTP cache directives. These directives may instruct the client 210 to cache a video for a period of time in a manner similar to that discussed above. These directives may be used in addition to or as alternatives to the above-discussed methods for determining when to delete video segments from cache or other storage.

Upon receipt of a command, or HTTP directive, to cache a video, or video segment, the client 210 may store the video segment in storage. Potential storage locations may include a cache associated with the web browser that the user uses to access and view videos, as well as any other storage location accessible by the client device. As previously discussed, a wide range of client devices may be utilized to fetch and view videos, including personal computers, PDAs, tablets, mobile phones, set top boxes, etc. Accordingly, storage accessible by any of these devices may be used to cache videos. Because video segments may be stored in locally accessible storage, the client 210 may access the video segments without connecting to a network. Thus, video segments may be delivered to users more reliably and efficiently, without being subject to latency and other problems associated with delivery of data over a network connection.

Latency may be further reduced by storing video segments, not only locally at the user device, but also at remote nodes within a server system or content delivery network (CDN), for example. In accordance with certain embodiments, a CDN may be implemented with a system of computers containing copies of data at various nodes of a network. Such a CDN may improve access to video segments by client devices by distributing copies of video segments to nodes that are geographically proximate to the client devices of users that access the video segments. By strategically placing video segments at nodes in close network proximity to a client device, latency and download time is reduced for segments delivered to the client device of a user. In certain embodiments, a CDN may cache videos, video segments, metadata, or other information.

In addition to video content, other information pertaining to videos made available to users may be transmitted between a web service 200 and each client device 210. For example, the client 210 may send to a web service 200 a request for metadata pertaining to one or more videos stored or otherwise made accessible through the web service 200. The requested metadata may comprise various data associated with a video, such as the video filename, title, description, rating, format, size, overall length, number of segments, and segment lengths. One or more elements of the metadata may be displayed to the user through the client 210, so that the user may determine whether to select to receive video content. For example, the user may view a description associated with a video to determine whether the subject matter of the video is likely to appeal to the user. Further, the user may view the rating information associated with a video to gauge whether other users found the video to be appealing. Metadata may also be used by the client 210 in other ways, such as to determine the necessary amount of space that must be allocated for a video or video segment.

According to certain embodiments, the client 210 may also send to a web service 200 usage data associated with a user. Usage data may contain information pertaining to videos, or video segments, viewed by the user, as well as browsing activity of a user. For example, the usage data may include information regarding the titles or file names of videos viewed by the user and the identification of particular video segments viewed by a user. The usage data may also contain information pertaining to the video categories or titles browsed by the user with the client 210 but not viewed by the user (e.g., information pertaining to searches performed by the user).

Usage information may be aggregated at either the user device or the web service 200 to develop a user profile. The user profile may reflect information obtained from usage data for a user, such as data pertaining to videos, or video segments, viewed or browsed by the user. In addition, a user may manually specify the types of videos in which the user is interested by subject matter, title, source, etc.

In accordance with certain embodiments, the client 210 may send to the web service 200 requests for recommendations of videos that may be of interest to a user. The request for recommendations may be a general request for recommendations for videos that may be of interest to the user or a more specific request for recommendations of videos with a certain characteristic specified by the user (e.g., subject matter, source, actor, producer, or rating). The web service 200 may respond to a request for recommendations based on information stored in a user profile, as well as other information stored by the web service 200 pertaining to videos accessible through the web service (e.g., metadata). For example, the web service 200 may evaluate a general request for recommendations by consulting a profile associated with a user. Accordingly, the web service 200 may recommend to the user a video that falls within a subject matter specified as being of interest to the user in the user profile. As discussed above, this subject matter may have been manually specified by the user or automatically determined based on usage data for the user. The web service 200 may respond to a specific request for recommendations of videos with a certain characteristic by presenting to the user for selection a list of videos that possess the characteristic. For example, a user may request a recommendation for a video that contains an actor input whose name has been input into the client 210 by the user. The web service 200 may consult metadata associated with all videos stored by the web service 200 to identify all videos featuring the actor. Optionally, these videos may further be automatically ordered by some additional metadata, such as the rating each video has received from the viewing population. For example, the web service 200 may respond to a user's request for movies containing a specified actor with a list of videos accessible through the web service 200 ordered from the highest rated video to the lowest rated video. Numerous data collected regarding users' viewing and browsing histories may be used for providing recommendations, such as a user's history of viewing certain shows, channels, and categories of videos, as well as a user's activities related to sharing videos with others on a social network.

In addition to providing recommendations for individual videos that may be of interest to a user, the web service 200 may also provide video playlists consisting of videos that are likely to be of interest to the user. These playlists may be created in a manner similar to that discussed above, such as by analyzing a user profile or by searching for videos meeting user-specified criteria, or the playlists may be created based on other behavior of the user or other users of the web service 200. For example, the viewing and browsing activities of users with similar user profiles to a requesting user may be used to influence video recommendations and playlists created for the requesting user. The web service 200 may also make recommendations based on a video graph.

Whether created manually by a user or automatically using information stored in a user profile, video playlists may be used to determine the data that is pre-fetched by the client 210 of a given user. For example, if a user has created a playlist containing five videos that the user is interested in viewing, a first segment from each of the five videos may be pre-fetched and stored in a cache on the user's device, so that playback may begin instantaneously if the user selects to view any of those five videos. A similar arrangement could also be implemented for other types of content, such as playlists of songs or other audio files.

Even in instances where playlists have not been created for a user, usage data pertaining to a user may be analyzed to determine the content that a user is most likely to select for viewing. In the case of video content, such an analysis may be used to pre-fetch the first segment of each identified video, so that the user may access the videos instantaneously upon selection. If the user does not select one of those videos within a certain period of time since the time the video was pre-fetched, the pre-fetched portion of the video may be deleted or erased from the client device to make room for other video segments. The period of time after which a pre-fetched video segment will lapse may be set either automatically or manually by a user.

In addition to the embodiments disclosed above for delivering video segments and metadata to client 210, videos may also be delivered by other techniques, such as multicast or other broadcast mechanisms. Using a broadcast architecture, one video segment may be delivered to many clients simultaneously. For example, the first segment, or scene, of every television show scheduled for release on a given day may be delivered via broadcast by a multiple system operator (e.g., a cable or satellite operator) to a plurality of clients to reduce the amount of time it takes to begin playback at each video browser. Such a delivery method provides the advantage of reducing the total amount of data transmitted over a given media.

Figure 3:
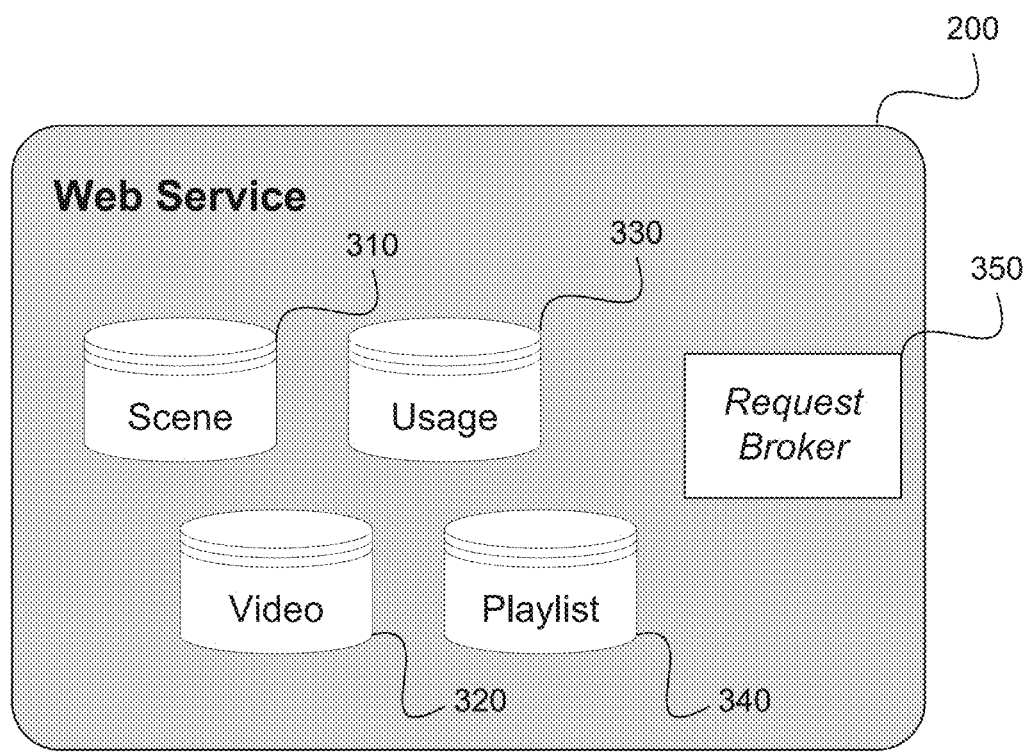
FIG. 3 is a diagram depicting an exemplary web service architecture, in accordance with an embodiment of the present disclosure.

FIG. 3 depicts an exemplary architecture for a web service, consistent with an embodiment of the present disclosure. As will be appreciated, the exemplary embodiment of FIG. 3 may be used to implement, for example, web service 200. In addition to components illustrated in FIG. 3, other components or modules may be provided as part of web service 200.

Consistent with the example of FIG. 3, web service 200 may comprise one or more servers and/or databases for implementing, for example: a scene database 310, a video database 320, a usage database 330, and a playlist database 340. The web service 200 may also include one or more servers and/or databases for implementing various functions associated with the above components, such as data and file storage, handling recommendations, and brokering requests from client devices.

The scene database 310 may be used to store videos or video segments identified for distribution to client devices. The video database 320 may store metadata corresponding to the videos or video segments stored in the scene database 310. Usage data for users of the web service may be logged in the usage database 330. Video playlists may be stored in the playlist database 340.

The web service also includes a request broker 350 to facilitate communication between the web service 200 and one or more clients 210. This may be implemented through an Application Programming Interface (API) that contains the functions used by the web service 200 and each client 210 to communicate with one another. Accordingly, when a user directs the client 210 to request a video from the web service 200, the client 210 utilizes the API provided by the request broker 350 to call the necessary functions. In certain embodiments, the request is coordinated or implemented by a browser or other application running on the client 210.

Figure 4:
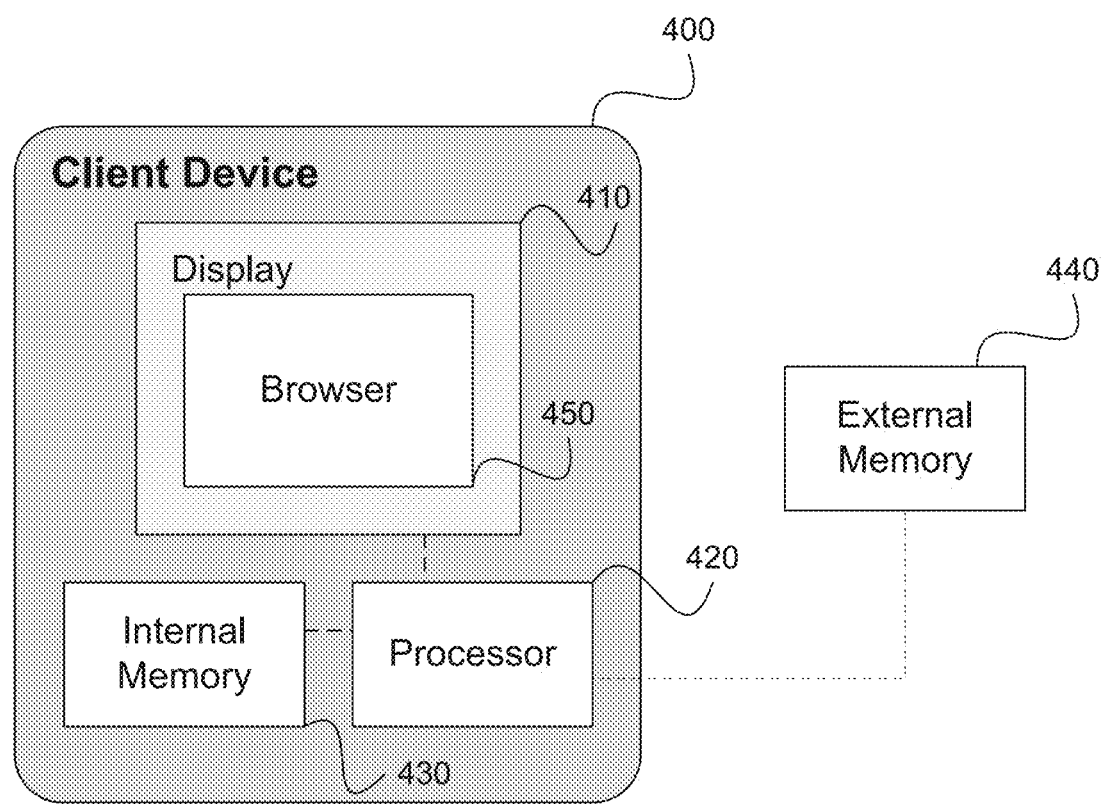
FIG. 4 is a diagram depicting an exemplary client architecture, in accordance with an embodiment of the present disclosure.

FIG. 4 depicts an exemplary architecture for a client device 400, consistent with an embodiment of the present disclosure. As will be appreciated, the exemplary embodiment of FIG. 4 may be used to implement, for example, client 210. In addition to components illustrated in FIG. 4, other components or modules may be provided as part of client device 400 (i.e., client 210). In the present disclosure, references to client device 400 and client 210 are interchangeable.

Consistent with the example of FIG. 4, client device 400 may include a processor 420 to access video data (e.g., video segments, metadata) from cache or other storage, such as internal memory 430 and/or external memory 440. Processor 420 may send data to display 410 for presentation to the user through a browser, media player, or other application 450. Client device 400 sends and receives video content and related data to and from web service 200 through a network connection (not shown). The network connection may be established through one or more networks, such as the Internet.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while embodiments are disclosed herein with reference to video segments and video playlists, it will be understood that embodiments consistent with the present disclosure may be implemented for other types of content, including songs and other types of audio files. Therefore, the various embodiments may be implemented for pre-fetching segments of one or more songs and delivering selected songs over the Internet for play-back at a client device. In certain embodiments, a user's song playlist may be used to determine which audio segments should be pre-fetched and delivered to a client device before play-back of any selected song on the playlist.

As a further example, advantageous results still could be achieved if steps of the disclosed techniques were performed in a different order and/or if components in the disclosed systems were combined in a different manner and/or replaced or supplemented by other components. Other implementations are within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented method for transmitting a video over an electronic network, comprising:
  receiving a video including a first frame and a second frame;
  computing a distance measure indicating a degree of change between the first frame and the second frame;
  determining whether a scene change has occurred in the video based on the distance measure;

in response to determining that the scene change has occurred in the video, dividing the video into segments, each segment comprising a plurality of frames;

determining a number of one or more segments to transmit to a client device, the number of the one or more segments being determined based on at least one of an amount of available memory storage or usage data associated with the client device; and transmitting, over the electronic network, the one or more segments to a client device without receiving an explicit request from the client device for the one or more segments.

2. The computer-implemented method of claim 1, wherein the segments are equal in size.

3. The computer-implemented method of claim 1, further comprising:

analyzing visual and audio components of the video; and dividing the video into the segments based on the analysis of visual and audio components of the video.

4. The computer-implemented method of claim 1, wherein computing the distance measure comprises computing the distance measure indicating a degree of change between color histograms of the first and second frames.

5. The computer-implemented method of claim 1, further comprising receiving a notification that the client device has started playing the one or more video segments.

6. The computer-implemented method of claim 5, wherein transmitting a second one or more video segments to the client device is completed prior to receiving the notification that the client device has started playing the first one or more video segments.

7. The computer-implemented method of claim 1, further comprising:

receiving usage data from the client device;

identifying the video to send to the client device based on the received usage data;

dividing the identified video into the first one or more segments; and transmitting the first one or more segments to the client device without receiving an explicit request from the client device for the identified video.

8. The computer-implemented method of claim 1, transmitting an additional video segment to the client device using hypertext transfer protocol.

9. The computer-implemented method of claim 1, streaming an additional video segment to the client device.

10. The computer-implemented method of claim 1, wherein the memory storage of the client device is a cached-storage.

11. A system for transmitting a video over an electronic network, comprising:

a memory; and a processor coupled to the memory and configured to execute instructions to:

receive a video including a first frame and a second frame;

compute a distance measure indicating a degree of change between the first frame and the second frame;

determine whether a scene change has occurred in the video based on the distance measure;

in response to determining that the scene change has occurred in the video, dividing the video into segments, each segment comprising a plurality of frames;

determining a number of one or more segments to transmit to a client device, the number of the one or more segments being determined based on at least one of an amount of available memory storage or usage data associated with the client device; and transmitting, over the electronic network, the one or more segments to a client device without receiving an explicit request from the client device for the one or more segments.

12. The system of claim 11, wherein the segments are equal in size.

13. The system of claim 11, wherein the processor is further configured to execute instructions to:

analyze visual and audio components of the video; and divide the video into the one or more segments based on the analysis of visual and audio components of the video.

14. The system of claim 11, wherein the processor is further configured to execute instructions to compute the distance measure based on a degree of change between color histograms of the first and second frames.

15. The system of claim 11, wherein the processor is further configured to execute instructions to receive a notification that the client device has started playing the one or more video segments.

16. The system of claim 15, wherein the processor is further configured to execute instructions to transmit a second one or more video segments to the client device prior to receiving the notification that the client device has started playing the first one or more video segments.

17. The system of claim 11, wherein the processor is further configured to execute instructions to:

receive usage data from the client device;

identify the video to send to the client device based on the received usage data;

divide the identified video into the first one or more segments; and transmit the first one or more segments from the identified video to the client device without receiving an explicit request from the client device for the identified video.

18. The system of claim 11, wherein the processor is further configured to execute instructions to transmit an additional video segment to the client device using hypertext transfer protocol.

19. The system of claim 11, wherein the processor is further configured to execute instructions to stream an additional video segment to the client device.

20. The system of claim 11, wherein the memory storage of the client device is a cached-storage.

21. A non-transitory computer-readable storage medium including instructions for transmitting a video over an electronic network, which, when executed, perform steps comprising:

receiving a video including a first frame and a second frame;

computing a distance measure indicating a degree of change between the first frame and the second frame;

determining whether a scene change has occurred in the video based on the distance measure;

in response to determining that the scene change has occurred in the video, dividing the video into segments, each segment comprising a plurality of frames;

determining a number of one or more segments to transmit to a client device, the number of the one or more segments being determined based on at least one of an amount of available memory storage or usage data associated with the client device; and transmitting, over the electronic network, the one or more segments to a client device without receiving an explicit request from the client device for the one or more segments.

\* \* \* \* \*